(12) United States Patent
Alkemade et al.

(10) Patent No.: US 6,530,215 B2
(45) Date of Patent: Mar. 11, 2003

(54) METHOD AND APPARATUS FOR PROCESSING EXHAUST GAS FROM AN INTERNAL COMBUSTION ENGINE

(75) Inventors: Ulrich Alkemade, Leonberg (DE); Peter Horstmann, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/935,303

(22) Filed: Aug. 22, 2001

(65) Prior Publication Data

US 2002/0062643 A1 May 30, 2002

(30) Foreign Application Priority Data

Aug. 26, 2000 (DE) .......................................... 100 42 010

(51) Int. Cl.⁷ ................................................ F01N 3/00
(52) U.S. Cl. ............................. 60/286; 60/274; 60/297; 60/298; 60/303
(58) Field of Search ........................ 60/274, 284, 286, 60/297; 289/295; 298/303; 422/182, 183

(56) References Cited

U.S. PATENT DOCUMENTS

| | | | | |
|---|---|---|---|---|
| 5,339,630 A | * | 8/1994 | Pettit | 60/303 |
| 5,572,866 A | * | 11/1996 | Loving | 60/303 |
| 5,606,856 A | * | 3/1997 | Linder et al. | 60/286 |
| 5,657,625 A | * | 8/1997 | Koga et al. | 60/274 |
| 5,771,683 A | * | 6/1998 | Webb | 60/286 |
| 5,826,428 A | * | 10/1998 | Blaschke | 60/303 |
| 5,829,248 A | * | 11/1998 | Clifton | 60/286 |
| 6,023,929 A | * | 2/2000 | Ma | 60/295 |

* cited by examiner

Primary Examiner—Thomas Denion
Assistant Examiner—Tu M. Nguyen
(74) Attorney, Agent, or Firm—Michael J. Striker

(57) ABSTRACT

The apparatus (1) for treating exhaust gas from an internal combustion engine includes a storing catalyzer for absorbing $NO_x$ during lean operating conditions and a device for burning fuel (3) in an exhaust gas stream (2) to produce a reducing atmosphere in the exhaust gas for storing catalyst regeneration and an aerodynamic control device for controlling the burning of the fuel in the exhaust gas stream, so that combustion is clearly improved when the engine is operated under lean operating conditions and no carbon is formed.

10 Claims, 1 Drawing Sheet

METHOD AND APPARATUS FOR PROCESSING EXHAUST GAS FROM AN INTERNAL COMBUSTION ENGINE

BACKGROUND OF THE INVENTION

1. Field of the Invention

The present invention relates to an apparatus and method for processing exhaust gas from an internal combustion engine and, more particularly, to an apparatus for processing exhaust gas from an internal combustion engine including a storing catalyst, in which fuel is burned in an exhaust gas stream in order to produce a reducing atmosphere in the exhaust gas.

2. Description of Related Art

Legal regulations, which control emissions from motor vehicles for protection of health and the environment, are continually being enhanced according to the advancing state of the art. Besides, e.g., the use of appropriately modified fuel in order to fulfill these regulations, $NO_x$-storing catalysts, which store nitrogen oxides during lean motor vehicle operation, i.e. when air is present in excess ($\lambda>1$) in the exhaust gas during the combustion process, are employed. Under these conditions only minimal carbon monoxide and fuel emissions occur, however comparatively high $NO_x$ emissions occur. Particularly the exhaust gas contains nitrogen monoxide (NO).

The $NO_x$-storing catalysts are able to store $NO_x$-compounds because of their coating, which absorbs $NO_x$ from the exhaust gas, until the $NO_x$-storing catalysts are completely filled so that they cannot store any more $NO_x$. For regeneration of the $NO_x$-storing catalysts a reducing exhaust gas atmosphere ($\lambda<1$) is produced, which is, for example, not typical for modern diesel engines.

An incomplete combustion of fuel, in which carbon monoxide and fuel material (HC) are emitted, results from an under-stoichiometric air/fuel ratio ($\lambda>1$). These reducing agents and hydrogen ($H_2$) regenerate the $NO_x$-storing catalysts during a short regeneration phase, in which the stored $NO_x$-compounds together with the carbon monoxide (CO) and fuel materials (HC) and/or the hydrogen ($H_2$) in the catalyzer are broken down into carbon dioxide ($CO_2$) and water ($H_2O$), above all to nitrogen ($N_2$).

Generally an Otto engine can be operated fairly easily under both lean and rich conditions. Rich operation in a diesel engine is comparatively difficult so that regeneration of the $NO_x$-storing catalysts must be performed by means of additional auxiliary systems.

Currently Diesel fuel is directly fed to an exhaust gas stream and burned for producing a reducing exhaust gas atmosphere. This Diesel fuel is injected and ignited only in a simple manner. The input fuel burns comparatively uncontrollably so that undesirable carbon formation occurs and the combustion is only influenced with some difficulty.

SUMMARY OF THE INVENTION

It is an object of the present invention to provide an apparatus for treatment of exhaust gas from an internal combustion engine including a storing catalyst and an additional fuel combustor, in which substantially no carbon is formed, even with a strongly under stoichiometric air-fuel ratio.

It is another object of the present invention to provide a method of processing exhaust gas from an internal combustion engine to reduce pollutant emissions from the engine, even under strongly fuel rich operating conditions.

These objects and others, which will be made more apparent hereinafter, are attained in an apparatus for processing exhaust gas from an internal combustion engine to reduce or eliminate pollutant emissions, which apparatus includes a storing catalyst and means for burning fuel in an exhaust gas stream during lean operation in order to produce a reducing atmosphere in the exhaust gas.

According to the invention the apparatus for processing the exhaust gas includes aerodynamic means for controlling the burning of the fuel in the exhaust gas stream in order to produce the reducing gas atmosphere.

The method of processing exhaust gas to better reduce and eliminate pollutant emissioris includes burning fuel in the exhaust gas stream during lean operation and controlling the burning of the fuel in the exhaust gas stream by means of an aerodynamic device.

Additional aspects and embodiments of the invention are claimed and described in the appended dependent claims.

The apparatus according to the invention is characterized by an aerodynamic controller for the combustion of fuel in the exhaust gas stream.

This sort of controller guarantees that no undesired carbon formation takes place even under under-stoichiometric air-fuel conditions. At the same time good control of the burning or combustion of fuel in the exhaust gas stream is provided, for example in periodic operation of the apparatus.

Control of the burning rate preferably occurs, so that the air-fuel ratio can be flexibly adjusted to differing conditions.

The combustion preferably occurs with fuel, which is also used in the internal combustion engine, i.e. generally with Diesel fuel, or fuel derived from it, for example with reformed hydrogen derived from the fuel. However other fuels can be used, which are burned according to the invention and thus, for example, produce a carbon monoxide and/or hydrogen rich treatment gas for the regeneration. A substantially incomplete oxidation of the fuel occurs in the combustion occurring in the exhaust gas stream according to the invention.

In a special embodiment of the invention the aerodynamic controller includes at least one flow-restricting device, so that the exhaust gas stream is accelerated. The turbulence intensity and the speed distribution are controlled so that advantageous spinning or swirling and mixing of the burning fuel-air mixture and the exhaust gas occur. An orifice, a screen or a baffle plate can be provided as the flow-restricting device and/or flame holder.

The aerodynamic means for controlling the combustion includes at least one swirling device, so that an additional spatial localization and stabilization of the flame occurs. For example, swirling or spinning devices can be provided both upstream and downstream of the fuel inlet. Because of these features a carbon-poor combustion is guaranteed at under-stoichiometric conditions. The combustion conditions are directly influenced in a positive manner in combination with the above-described flow-restricting device.

Advantageously the aerodynamic controller includes at least one recirculating device so that a part of the exhaust gas from the reaction or combustion chamber is fed back to the burning flame, which reduces the average temperature of the flame and local temperature spikes, whereby the $NO_x$ fraction of the exhaust gas decreases. Furthermore the under-stoichiometric combustion is additionally spatially stabilized because of the recirculating device, especially in cooperation with the above-described flow-restricting and swirling devices. Especially because of the recirculation exhaust gas that has scarcely any carbon results from combustion in near- or under-stoichiometric air/fuel mixtures.

In other embodiments the apparatus has at least one bypass, which receives a portion of the exhaust gas stream from the internal combustion engine, so that a definite exhaust gas volume flow always passes through the apparatus according to the invention at different operating conditions of the internal combustion engine. Because of this feature nearly constant flow conditions are guaranteed in the apparatus so that the combustion is additionally controllable in an advantageous manner.

The exhaust gas volume flow is adjusted reliably to other combustion conditions by means of an appropriate exhaust gas flow control means so that more or less exhaust gas is conducted through the apparatus as required, which is advantageous, for example, during combustion ignition.

Preferably the apparatus includes an air supply device so that the regeneration of the $NO_x$-storing catalyst is, for example, performed during stoppage of the internal combustion engine. At the same time this embodiment facilitates a definite adjustment of the oxygen content in the exhaust gas stream to a predetermined value.

The apparatus preferably includes means for cooling so that an overheating of the apparatus, especially the fuel supply, is prevented.

Preferably an oxidation catalyzer is arranged between the apparatus and the storing catalyzer, in which nitrogen monoxide (NO) is converted to nitrogen dioxide ($NO_2$), so that the $NO_x$-storing catalyzer is supplied nitrogen dioxide almost exclusively. Because of that feature the storing of the exhaust gas nitrogen in the $NO_x$-storing catalyzer is optimized, since the nitrogen dioxide ($NO_2$) is converted to the nitrate ($NO_3$) and that is absorbed.

In a special embodiment of the invention a particle filter is arranged between the storing catalyzer and the apparatus for burning fuel in the exhaust gas stream. This particle filter decreases particle emissions from both the internal combustion engine and the apparatus for burning fuel in the exhaust gas stream so that they do not reach the storing catalyzer.

Advantageously the particle filter is regenerated by the apparatus according to the invention, whereby the regeneration of the particle filter occurs at over-stoichiometric or lean conditions ($\lambda>1$). Thus the apparatus is operated in an advantageous manner at the two different combustion air/fuel ratios. A reducing process gas is produced for storing catalyst regeneration (under-stoichiometric operating conditions) and the particle filter is cleaned by burning off particles in large spacing (over-stoichiometric operating conditions).

BRIEF DESCRIPTION OF THE DRAWING

The objects, features and advantages of the invention will now be illustrated in more detail with the aid of the following description of the preferred embodiments, with reference to the accompanying figures in which.

DESCRIPTION OF THE PREFERRED EMBODIMENTS

Figure 1:
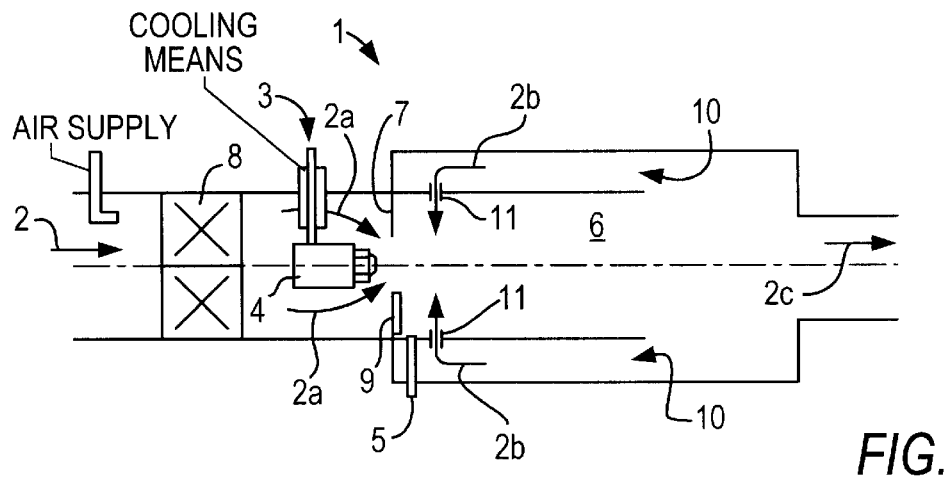
FIG. 1 is a diagrammatic cross-sectional view through an apparatus for treating or processing exhaust gas according to the invention.

FIG. 1 shows an apparatus 1 for treatment of exhaust gas 2 from an internal combustion engine, in which a reducing exhaust gas atmosphere is produced by means for combustion of the fuel 3. The fuel 3 is sprayed or atomized by means of a sprayer 4. An igniter 5 ignites the fuel 3 so that it burns in a combustion chamber 6 for regeneration.

A flow-restricting baffle disk 7, a swirl producing device 8 and several swirl slots 9, which are included in the baffle disk 7, conduct the exhaust gas 2a into the combustion chamber 6, so that a nearly carbon-free combustion is guaranteed. The combustion chamber 6 is arranged inside a recirculation duct 10, in which several recirculation openings 11 are provided in order to permit feed back of the exhaust gas 2b. For example, the recirculation openings 11 can be changeable in size, so that an additional adjustment to the changing conditions in the combustion chamber is guaranteed. After leaving the combustion chamber 6 the carbon monoxide rich exhaust gas 2c is fed to the storing catalyst 12.

An additional flexible adjustment to the changing conditions in the exhaust gas can occur by control of the fuel supply. The speed distribution, the turbulence intensity and the mixing of the injected fuel can be controlled with the fuel supply and with the aid of the baffle plate 7, the swirl producing device 8 and the swirl slots 9, whereby an aerodynamic stabilization of the flame is guaranteed.

Above all, a speed distribution field is produced by building in the flow field, especially by means of the flame holder (baffle plate 7), by the swirling means (swirl producing device 8, swirl slots 9) and/or by the exhaust gas feed back (recirculation duct 10, recirculation opening 11), in which energy is supplied to the root of the flame by transport of hot exhaust gas and the flame is stabilized in the vicinity of the flame holder. Alternatively or in combination with the swirling means (swirl producing device 8, swirl slots 9) the exhaust gas 2 of the apparatus 1 can be supplied already swirled.

Figure 2:
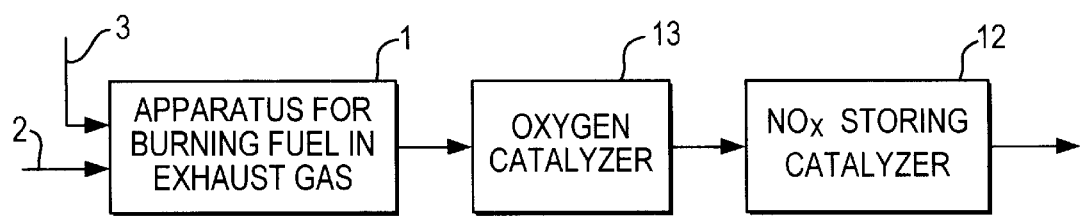
FIG. 2 is a flow diagram of a process for treating exhaust gas with the apparatus according to the invention, an oxygen catalyzer and a storing catalyzer.

FIG. 2 shows a process flow chart. An oxidation catalyzer 13 is arranged between the apparatus 1 for treatment of exhaust gas and the storing catalyzer 12, so that more nitrogen dioxide and less nitrogen monooxide reach the storing catalyzer 12.

Figure 3:
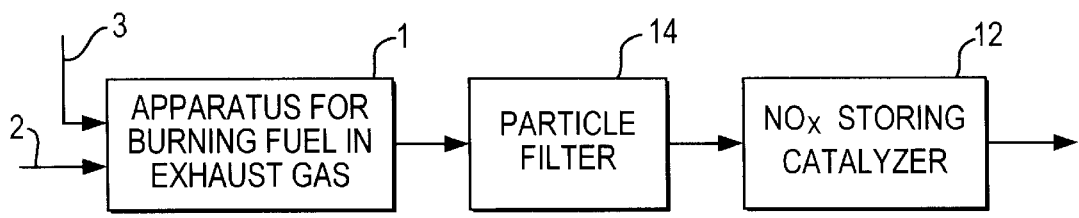
FIG. 3 is a flow diagram of a process for treating exhaust gas with the apparatus according to the invention, a particle filter and a storing catalyzer.

FIG. 3 shows another process flow chart. A particle filter 14 is arranged between the apparatus 1 for treatment of the exhaust gas and the storing catalyzer 12. The particle filter 14 can be both a simple particle filter 14 and also a catalyst-coated particle filter 14, which is a combination of a oxidation catalyzer 13 and a simple particle filter 14. Alternatively in place of a catalyst-coated particle filter an oxidation catalyzer 13 can be arranged between the apparatus 1 for treating the exhaust gas and a simple particle filter 14.

The fuel supply rate for regeneration of the storing catalyzer 12 can be estimated from a calculation of the chemical equilibrium of the principle ingredients of an under-stoichiometric flame ($CO_2$, CO, $H_2O$, $H_2$, $N_2$). The consumption by the apparatus 1 according to the invention reduces itself proportionally with a reduction of the nitrogen monoxide content and the set air ratio in the exhaust gas 2.

The disclosure in German Patent Application 100 42 010.90-013 of Aug. 26, 2000 is incorporated here by reference. This German Patent Application describes the invention described hereinabove and claimed in the claims appended hereinbelow and provides the basis for a claim of priority for the instant invention under 35 U.S.C. 119.

While the invention has been illustrated and described as embodied in an apparatus for treating exhaust gas from an internal combustion engine, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

We claim:

1. An apparatus for treating exhaust gas from an Internal combustion engine, said apparatus for treating exhaust gas comprising:
   a storing catalyzer (12) connected with the internal combustion engine to receive said exhaust gas of the internal combustion engine;
   means for supplying fuel to an exhaust gas stream (2) behind the internal combustion engine:
   means (4, 5, 6) for burning fuel (3) in the exhaust gas stream (2) to provide a reducing atmosphere in the exhaust gas; and
   aerodynamic means (7, 8, 9, 10, 11) for controlling the burning of the fuel (3) in the exhaust gas stream produced by said means for burning, so that substantially no carbon is formed, even during under-stoichiometric operation, said aerodynamic means including at least one swirling means.

2. The apparatus as defined in claim 1, wherein said aerodynamic means (7, 8, 9, 10, 11) include at least one flow-restricting device (7).

3. The apparatus as defined in claim 1, wherein said aerodynamic means (7, 8, 9, 10, 11) include at least one recirculating device (10, 11).

4. The apparatus as defined in claim 1, further comprising at least one bypass receiving a portion of said exhaust gas stream.

5. The apparatus as defined in claim 1, further comprising means for supplying air.

6. The apparatus as defined in claim 1, further comprising a cooling means.

7. The apparatus as defined in claim 1, wherein said means for burning said fuel in said exhaust gas stream comprises a combustion chamber (6) and said storing catalyzer is arranged downstream of the combustion chamber, and further comprising a particle filter (14) arranged between the combustion chamber (6) and the storing catalyzer (12), so that said exhaust gas stream passes through said particle filter (14) to said storing catalyzer.

8. The apparatus as defined in claim 1, wherein said means (4,5,6) for burning said fuel in said exhaust gas stream comprises a combustion chamber (6) and said supply catalyzer (12) is arranged downstream of the combustion chamber, and further comprising an oxidation catalyzer (13) arranged between the combustion chamber (6) and the supply catalyzer (12), so that said exhaust gas stream passes through said oxidation catalyzer (13) to said storing catalyzer.

9. A motor vehicle powered by an internal combustion engine, said motor vehicle comprising apparatus for treating exhaust gas comprising a storing catalyzer (12) connected with the internal combustion engine to receive the exhaust gas; said apparatus for treating exhaust gas comprising means for burning fuel (3) in an exhaust gas stream (2) to provide a reducing atmosphere in the exhaust gas and aerodynamic means (7, 8, 9, 10, 11) for controlling the burning of the fuel (3) in the exhaust gas stream produced by the means for burning, said aerodynamic means including at least one swirling means.

10. A process for treating exhaust gas from an internal combustion engine with a storing catalyzer (12), said process comprising the steps of:
   a) burning fuel (3) in an exhaust gas stream (2) from the internal combustion engine in order to produce a reducing atmosphere in the exhaust gas;
   b) aerodynamically by aerodynamic means controlling the burning of the fuel in the exhaust gas stream during strongly under-stoichiometric air/fuel conditions so as to produce substantially no carbon; and
   c) including at least one swirling means in the aerodynamic means.

* * * * *